Figure 1:
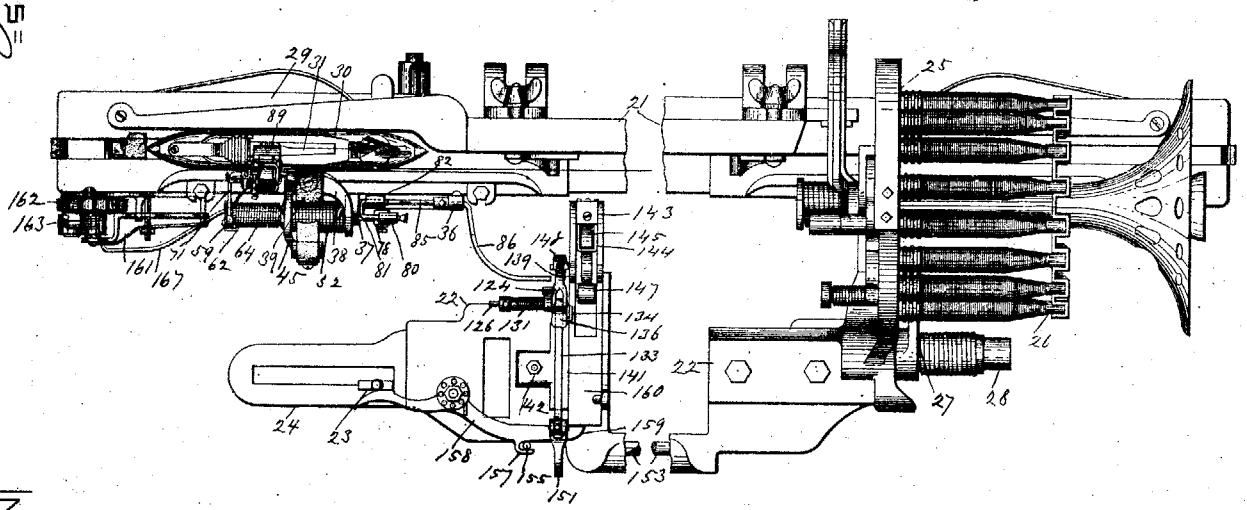

N. DEMERS.

WEFT REPLENISHING LOOM.

APPLICATION FILED OCT. 15, 1908.

12,887. Reissued Nov. 24, 1908.

7 SHEETS—SHEET 1.

WITNESSES:

Jos. S. Latimer

Frank A. Peters

INVENTOR:

Nazaire Demers.

By his ATTORNEY:

Arthur Brown

N. DEMERS.

WEFT REPLENISHING LOOM.

APPLICATION FILED OCT. 15, 1908.

12,887.

Reissued Nov. 24, 1908.

7 SHEETS—SHEET 2.

WITNESSES:

Jos. S. Latimer

Frank A. Peters

INVENTOR:

Nazaire Demers.

By his ATTORNEY

Arthur S. Browne

N. DEMERS.

WEFT REPLENISHING LOOM.

APPLICATION FILED OCT. 15, 1908.

12,887. Reissued Nov. 24, 1908.

7 SHEETS—SHEET 3.

WITNESSES=

Jos. S. Latimer

Frank A. Peters

INVENTOR=

Nazaire Demers.

By his ATTORNEY=

Arthur Browne

N. DEMERS.

WEFT REPLENISHING LOOM.

APPLICATION FILED OCT. 15, 1908.

12,887.

Reissued Nov. 24, 1908

7 SHEETS—SHEET 4.

WITNESSES=

Jos. S. Latimer

Frank A. Peters

INVENTOR=

Nazaire Demers.

By his ATTORNEY= Arthur Browne

N. DEMERS.

WEFT REPLENISHING LOOM.

APPLICATION FILED OCT. 15, 1908.

12,887. Reissued Nov. 24, 1908.

7 SHEETS—SHEET 5.

WITNESSES=
Jas. S. Latimer
Frank A. Peters

INVENTOR=
Nazaire Demers.
By his ATTORNEY= Arthur Browne

N. DEMERS.

WEFT REPLENISHING LOOM.

APPLICATION FILED OCT. 15, 1908.

12,887. Reissued Nov. 24, 1908.

7 SHEETS—SHEET 6.

WITNESSES=

Jas. S. Latimer

Frank A. Peters

INVENTOR=

Nazaire Demers.

By his ATTORNEY= Walter Brown

N. DEMERS.

WEFT REPLENISHING LOOM.

APPLICATION FILED OCT. 15, 1908.

12,887. Reissued Nov. 24, 1908.

7 SHEETS—SHEET 7.

WITNESSES:

Jos. D. Latimer

Frank A. Peters

INVENTOR:

Nazaire Demers.

By his ATTORNEY: Arthur Brown

UNITED STATES PATENT OFFICE.

NAZAIRE DEMERS, OF MANCHESTER, NEW HAMPSHIRE, ASSIGNOR TO DRAPER COMPANY, OF PORTLAND, MAINE, AND HOPEDALE, MASSACHUSETTS, A CORPORATION OF MAINE.

WEFT-REPLENISHING LOOM.

No. 12,887. Specification of Reissued Letters Patent. Reissued Nov. 24, 1908.

Original No. 859,208, dated July 9, 1907, Serial No. 316,743. Application for reissue filed October 15, 1908. Serial No. 457,960.

*To all whom it may concern:*

Be it known that I, NAZAIRE DEMERS, a citizen of the United States, residing in Manchester, in the county of Hillsboro and State of New Hampshire, have invented certain new and useful Improvements in Weft-Replenishing Looms, of which the following is a specification.

This invention relates to that class of looms in which by means of an automatic filling-supplying mechanism a fresh supply of filling is provided at the proper time, and more particularly to "feeler looms" of the type in which the volume of filling in the shuttle is determined by the engagement therewith of a feeler which controls the time of operation of the filling-supplying mechanism, whereby when the filling has been exhausted to a predetermined point or degree the feeler will cause a fresh supply of filling to be provided; and my invention relates to certain novel mechanism and arrangements of parts whereby the operation of the device is improved as regards accuracy, and particularly whereby the feeler will act with a less volume of yarn or filling on the filling carrier than has heretofore been possible, thus reducing the waste of yarn or filling to a minimum.

The nature of the invention is fully described in detail below, and illustrated in the accompanying drawings, in which:—

Figure 2:
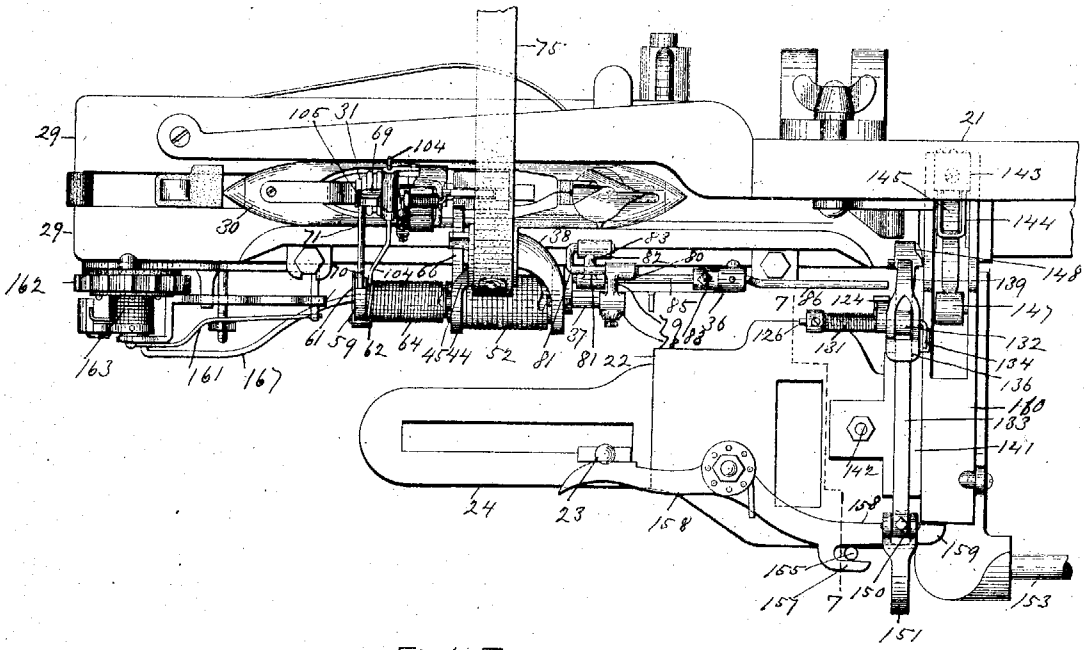
Figure 3:
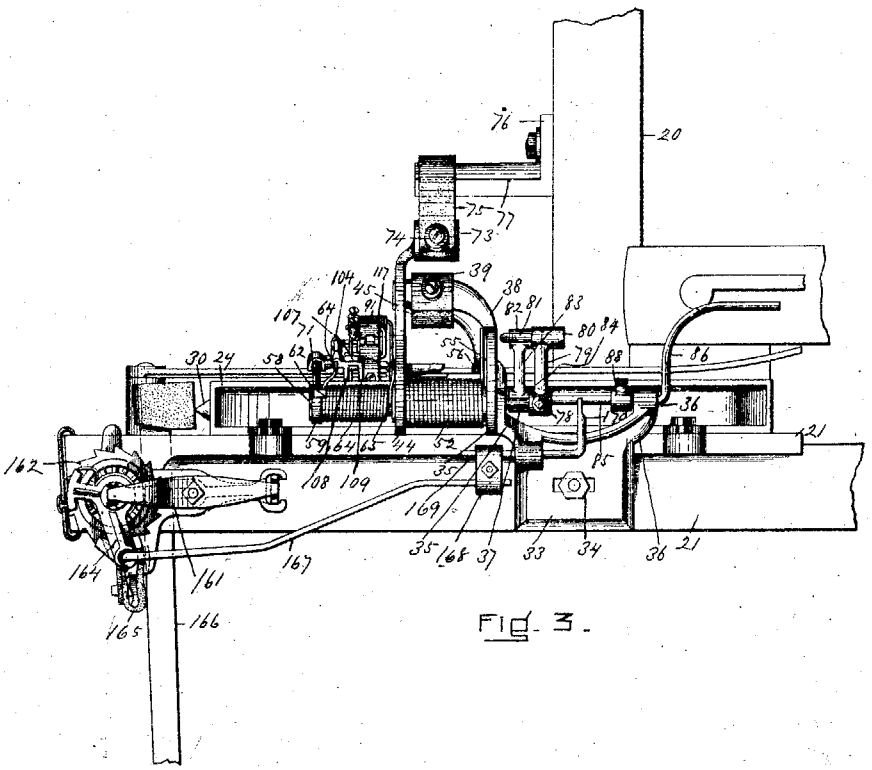
Figure 4:
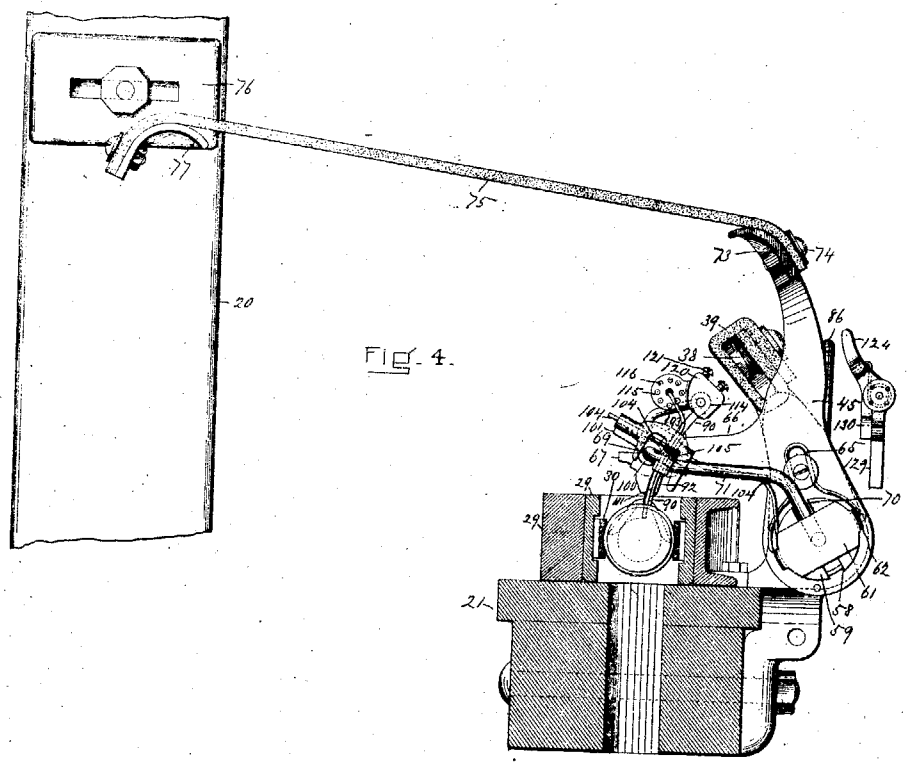
Figure 5:
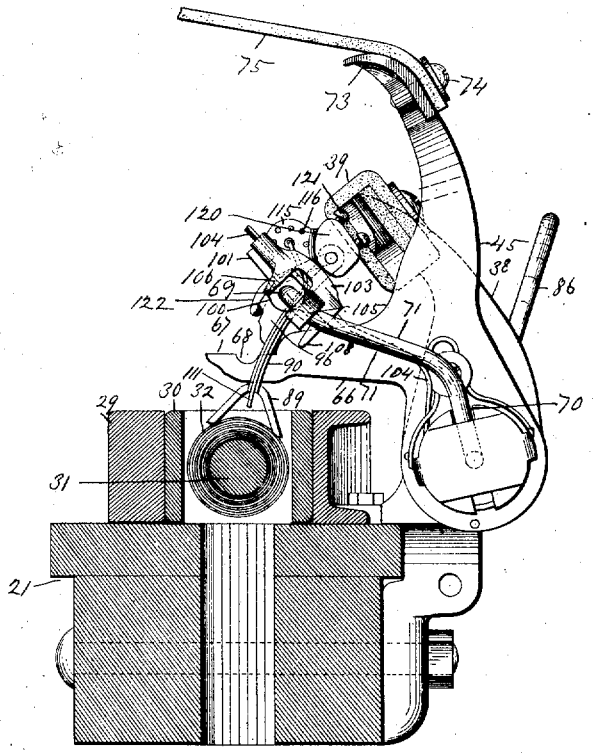
Figure 6:
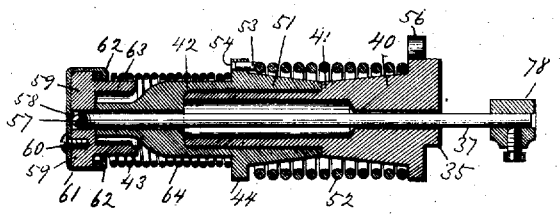
Figure 7:
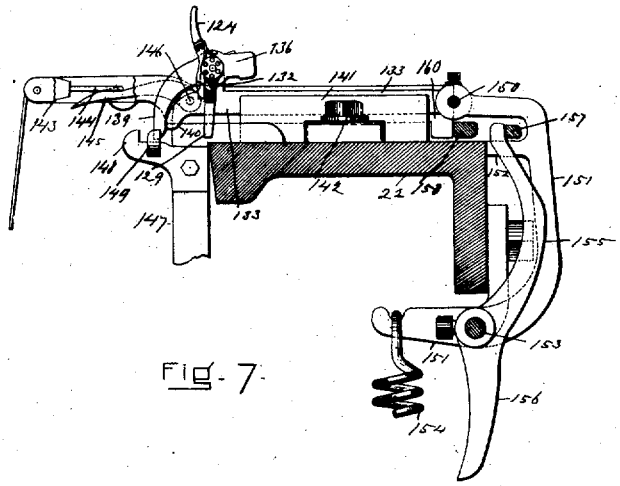
Figure 8:
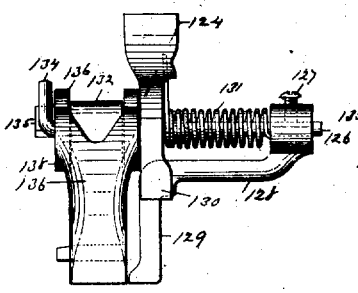
Figure 9:
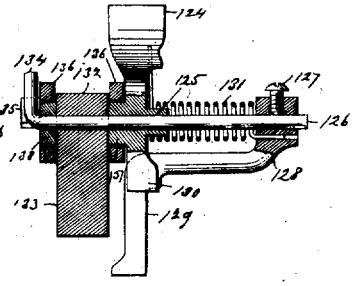
Figure 10:
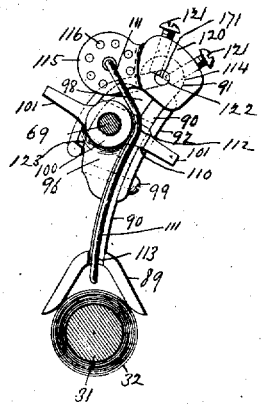
Figure 11:
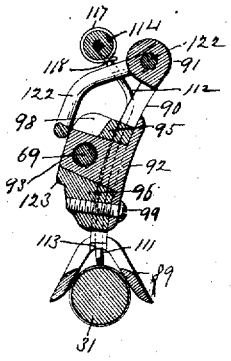
Figure 12:
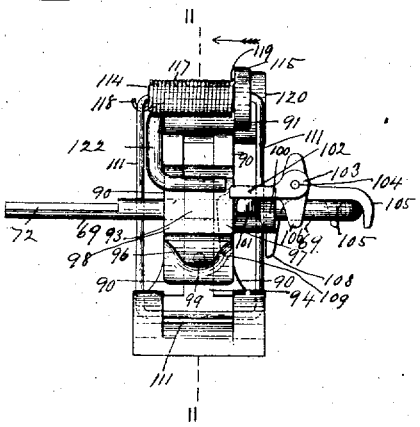

Figure 1 is a plan view of a portion of a loom provided with my improved mechanism, the central portion of the loom being broken out. Fig. 2 is an enlarged plan showing one end of the loom with my feeler-mechanism applied thereto. Fig. 3 is a front elevation of the same. Fig. 4 is an end elevation the lay being shown in cross section. Fig. 5 is a similar view with the feeler illustrated in its normal position. Fig. 6 is a longitudinal section taken through the link and springs on the feeler-carrier-rod. Fig. 7 is a section taken on line 7—7, Fig. 2. Fig. 8 is a front view of the latch-mechanism. Fig. 9 is a sectional view of the same. Fig. 10 is a detail side elevation of a part of the feeler-mechanism. Fig. 11 is a section taken on line 11—11, Fig. 12. Fig. 12 is a front elevation of the feeler.

Similar numerals of reference indicate corresponding parts.

Reference numeral 20 (Figs. 3 and 4) shows a portion of the frame, 21 is the lay, 22 the breast-beam, 23 the shipper-lever held normally in the notched holding-plate 24 attached to the breast-beam (Figs. 1 and 2), 25 the filling-feeder constructed to receive the ends of the filling-carriers 26, and 27 the transferrer mounted on the stud 28, none of the said parts being new in this invention, and all being operated in the manner well known in the art and as described, for instance, in United States Letters Patent Number 626,187.

29 represents the shuttle-box containing a shuttle 30 provided with a spindle or carrier 31, illustrated in Figs. 5 and 10 as loaded with filling 32.

As indicated in Fig. 1, the filling-feeder 25 is located at one end of the loom, and the feeler-mechanism at the opposite end opposite the shuttle-box, where it is mounted on the lay and adapted to coöperate with the filling in the shuttle when the shuttle is in the box.

A plate or bracket 33 is adjustably bolted at 34 to the front of the lay, and is provided with upward extensions 35 and 36. The extension 35 is horizontally bored to receive a horizontal portion 37 of the feeler-carrier-rod (Figs. 1, 2, 3 and 6), parallel with the lay. Integral with the extension 35 is a curved arm 38 which bends horizontally toward that end of the loom and over the lay, and is provided near its outer end with one or more layers of leather 39. Integral with and extending horizontally from the extension 35 at the point where it joins with the arm 38, is a tubular conical stud 40 (Fig. 6) through which the rod 37 extends, said stud being provided at 41 with an annular shoulder, and being of even thickness from said shoulder to its outer end, and thereby constituting a bearing for a hub 42 whose portion 43 is loose on the rod 37. The inner or main portion 42 is provided with an annular flange 44 integral with which is the feeler-carrier-arm or lifting-arm 45, below described. Surrounding the conical portion of the stud 40 and a somewhat similar conical extension 51 of the hub 42, is a spiral spring 52, one end 53 of which is engaged in a hole 54 in the flange 44 (Fig. 6) and the other end 55 (Fig. 3) is engaged by means of a suitable projection 56 on the inner lower portion of the arm 38. At 57 the rod 37 is bent upward into a radial slot 58 in a head 59 which has secured to it at 60 a strap or clamp 61 (Figs. 4 and 6) which extends across the head, thus confining the upturned portion of the rod in the slot 58, while the opposite ends 62 of the clamp extend inward against the tubular shank 63 which is integral with the head and extends inward therefrom. By means of these inturned lips 62 one end of a spiral spring 64 is clamped, said spring extending around the shank 63 and the hub 42, its opposite end being engaged, as shown at 65 in Fig. 3, by the flange 44.

The feeler-carrier-arm 45, which is prevented from horizontal movement by the spring 52 and the position of its hub 42 between the shoulder 41 and the head 59, and which is held normally in the raised position indicated in Fig. 5 by the two springs 52 and 64 which engage its flange 44 at 53 and 65 respectively, is provided with an extension or finger 66 (Figs. 1, 2, 4 and 5) extending over one edge of the shuttle-box, the outer end of said finger being extended horizontally toward the center of the loom at right angles with the finger and thereby providing a flat plate 67 horizontally grooved or recessed at 68 to receive and support one end 69 of the feeler-carrier-rod, which comprises the horizontal portion 37, above described, the portion 70 into which it is bent at 57, the portion 71 which extends from the portion 70 toward the shuttle-box, and the horizontal portion 69 which supports the feeler-mechanism and is adapted to rest in the groove 68. See Figs. 5, 10, 11 and 12. This portion 69 is flattened, as shown at 72, Fig. 12, in order that its surface may be flush with the surface of the flat plate 67. This plate 67 is adapted to rest up against the leather layers 39 on the arm 38. The upper end of the feeler-carrier-arm 45 is curved or spoon-shaped at 73 and is connected at 74 with a strap 75 whose opposite end is secured to the arch of the loom, and is adapted to be adjusted at that point by means of a slotted plate 76 shaped at 77 to receive the strap, as illustrated in Fig. 4.

Rigid on the opposite end of the feeler-carrier-rod is a hub 78 integral with a lever 79 provided with a sleeve 80 at its upper end, which is loose on one arm of a staple-shaped rod 81 whose other arm is loose in a sleeve 82 on a lever 83, whose lower end is provided with a hub 84 which is rigidly secured to the horizontal portion 85 of a crank-rod 86, said portion 85 being pivotally supported by the horizontally bored extension 36 which is integral with the plate or bracket 33. This crank-rod is held in position by a collar 88, and extends up in front of the lay, being rendered adjustable by suitable set-screws in the collar 88, and hub 84, the adjustability being aided by the set-screws in the hubs 78 and 84 whereby the hubs 80 and 82 may be relatively adjusted on the staple-shaped rod 81.

The feeler is illustrated in detail and on an enlarged scale in Figs. 10, 11, and 12. The portion of the feeler which rests on the filling is a yoke 89 integral with upwardly extending curved bars 90 and a hub 91 at the upper end of the bars. A plate 92 is located behind the bars 90 and is curved to correspond therewith, and a guide-block or projection 93 extends from the plate 92 through the space or slot 94 between the bars 90, and the portion 69 of the feeler-carrier-rod extends through this block 93 and allows it to rock on the rod. Surrounding the guide-block 93 is a frame through which the rod 69 extends, and consists of the parts 95 and 96 above and below the guide-block, and the parts 97 and 98 flanking it on opposite sides, and horizontally bored to receive said rod 69. A screw 99 extends through the plate 92 and the slot 94 into the portion 96, connecting said portion and plate rigidly, but permitting the frame 90 and 91 supporting the yoke 89 to be raised. The part 97 of the frame is extended into a hub 100 surrounding the rod 69, and from which there project the opposite radial arms 101 which are adapted when the hub is rotated to move in a circle which is intersected by a pair of fingers 102 which extend horizontally from and make a part of a frame which comprises the central portion 103 horizontally bored to receive the extended end 104 (Figs. 2, 3, 4, and 12) of the spring 64, the bifurcated arm 105 which lies on and straddles the upper end of the portion 71 of the feeler-carrier-rod, a downwardly extending prong 106, next the outer side of the portion 69 of the feeler-carrier-rod (Figs. 5 and 12), and the horizontal inward extension 107 whose end is provided with two downwardly extending prongs 108 and 109 (Figs. 3 and 12). One of the arms 101 is notched at 110 (Fig. 10) to allow of the passage of a wire frame 111 substantially rectangular in shape but which is bent outward at 112, said frame extending from within the yoke near the crotch up at opposite ends through notches 113 (Fig. 10) into the opposite ends of a horizontal tubular arm or shank 114 (Fig. 11) said shank being provided with a head 115 having a circle of perforations 116. A spiral spring 117 has one end 118 caught over the wire frame 111 and the other end 119 is inserted in one of the perforations 116, the one being utilized which will produce the desired tension in the spring. The head 115 is provided with an extension 120 into which by means of set-screws 121 one end of a U-shaped rod 122 is held, said rod extending through the hub 91 and thence downward, as shown in Figs. 11 and 12, and inward with its lower leg adapted under certain conditions to extend under a shoulder 123 in the part 96, as shown in Fig. 10.

With each forward throw of the lay the feeler-carrier-arm or lifting-arm 45 is drawn back by the strap 75 which is secured to the arch, against the power of the springs 52 and 64, allowing the horizontal portion 69 of the feeler-carrier-rod which lies in the grooved plate 67, 68 to swing down until the yoke 89 reaches the filling, on which it is pressed by means of the spring 64. The continuation of the downward swinging movement of the arm 66 causes the feeler-carrier-rod to part company with said arm 66 with each forward movement of the lay. When the filling-carrier is full the parts of the feeler are in the position indicated in Figs. 5 and 10, in which the yoke is shown as pressed on the filling, with the lower leg of the U-shaped rod 122 under the shoulder 123 on the part 96 of the frame, holding said frame which consists of the parts 95, 96, 97 and 98 in its highest position in and between the curved bars 90. As the filling decreases in volume so that the yoke dips deeper into the shuttle with each beat of the lay in order to reach it, the lower leg of the U-shaped rod 122 slips out from under the shoulder 123 and allows the spring 64 to force the frame 95, 96, 97, 98 down, the shoulder 123 slipping under the yielding leg of the rod 122. As said frame drops lower, the portion 69 of the feeler-carrier-rod 69, 71, 70, 37 drops with it, the horizontal part 37 rotating on its axis and swinging rearward the lever 79, staple-shaped rod 81 and lever 83 whose hub 84 rotates the horizontal portion 85 of the crank-rod and swings back the crank 86 for the purpose below described. The lower leg of the U-shaped rod 122 is held in its normal position by the spring 117 which is secured to and between the wire frame 111 and the swinging head 115, and the light power of the spring 117 is overcome by the stronger spring 64 as the shoulder 123 slips out of engagement with the rod 122, such disengagement being rendered possible by the descent of the yoke in a curved line as the bulk of the filling decreases. The yoke is centered in its movement by the extensions 106 and 107 of the frame 103 (Figs. 3, 5 and 12) which bear on the arms 101 extending from the hub 100 making a part of the frame 95, 96, 97, 98 (Figs. 11 and 12).

As long as the filling in the shuttle is greater in quantity than a certain predetermined amount, the feeler will be stopped before it reaches the limit of its possible downward movement, such stopping being rendered possible by the spring 64. The feeler-carrier-arm 45 however, as above stated, continues its swinging movement, the crank 86 engages the upwardly extending end 124 of a lever (Figs. 1, 2, 4, 7, 8, and 9) whose hub 125 is pivotally supported by a horizontal rod 126 rigidly connected at one end at 127 with a swinging bracket comprising the horizontal portion 128 and downwardly extending portion 129; and the opposite arm 130 of the lever 124 125 extends down into contact or engagement with the swinging bracket 128, 129, being held in such contact by a spiral spring 131 which is secured at its opposite ends to the swinging bracket and the lever 124. The horizontal rod is pivotally supported near its opposite end in the ear 132 extending upward from a bar 133, and the extreme end 134 of the rod 126 is bent as shown in Figs. 8 and 9, and adapted when the rod is rotated to swing against a dog 135 which extends from the rear end of a latch 136 pivoted on studs 137 and 138 which extend respectively from the lever 124, 125, 130, and the bar 133. This latch 136 has its end formed into a downwardly curved jaw 139 which is adapted to drop upon a jaw 140 of somewhat similar shape which extends from and makes a part of the front end of the bar 133. This bar is adapted to be moved horizontally in a slideway 141 which is mounted on the breast-beam 22 and secured thereto by the bolt 142. A slide 160 in the way 141 constitutes the support for the ordinary weft or filling-fork 143 provided with a tail 144 adapted to be engaged by the usual hook 145 which is pivoted at 146 to said slide 160, to which is also pivoted in the ordinary manner the weft-hammer 147 provided with the usual hook 148 having an ear 149. The outer end of the bar 133 is pivotally connected at 150 with a downwardly extending U-shaped arm 151 (Fig. 7) provided with a horizontal projection 152 which bears against the breast-beam 22. The lower portion of the arm 151 is rigid with a rock-shaft 153, and its extreme lower end is notched in the usual manner and thereby connected with the spring 154 which extends to the frame. Loosely mounted on the rock-shaft 153 is an arm 155 whose lower depending end 156 is adapted to throw out the take-up mechanism in the ordinary manner, its upper end being in engagement with the notched portion 157 of the knock-off lever 158, which bears against the shipper-lever 23. The extreme end 159 of the knock-off lever is adapted to be engaged by the slide 160 when a weft-thread breaks, all as usual, there being nothing new in the knock-off or shipping mechanism.

With every forward beat of the lay the crank 86 strikes the upwardly extending end of the lever 124 (this being timed to occur when the shuttle is at the left end of the loom as shown) with the effect that said lever by means of the connection of the spring 131 with the bracket 127, 128, rotates the rod 126 which is rigid with said bracket and swings its bent end 134 into engagement with the dog 135, swinging down the latch 136 and lifting its jaw 139, thus allowing the hook 148 to pass under said jaw, and the ear 149 operated in the usual manner by the weft-hammer or actuator 147, to strike the downwardly extending portion 129 of the swinging bracket 128, allowing the spring 131 to force the lever 124 forward again. This takes place constantly until the filling in the shuttle is so low that the crank 86 cannot swing far enough forward to strike the lever 124 and lift the jaw 139 of the latch, when the hook 148 in its movement strikes and pushes back the latch 139, 136, and thus pushes back the sliding bar 133 on which it is mounted, imparting rotation to the rock-shaft 153 by means of the mechanism 150 and 151, whereby a change of filling is effected in the ordinary manner.

In Figs. 1, 2 and 3 I have represented a picker-check mechanism which is the subject of an application for Letters Patent executed by me on the tenth day of April, 1906 and filed April twelfth, 1906, Serial Number 311,234. This mechanism is numbered generally 161, and comprises a ratchet 162, spring 163 and other parts which are not necessary to be described in this application as I propose to use any operative picker-check which can be connected with my invention. To an arm 164 which extends downward from the ratchet-mechanism and which is connected with the check 165 which operates on the picker-stick 166, I secure pivotally one end of a rod 167 which extends along in front of the lay and has its other end rigidly secured in a clamp 168. This clamp, which consists of two jaws, has rigidly and adjustably secured between its jaws one end of a horizontal rod 169 which is provided with an upturned end 170 beyond and on a level with the adjacent end of the feeler-carrier-rod 37 and the hub 78. As the shuttle engages the picker-stick, and operates the picker-check mechanism, it swings the arm 164 toward the end of the loom and pulls the rods 167 and 169 in the same direction, causing the upturned end 170 to engage that end of the feeler-carrier-rod 37 and push it in the same direction and forcing the hub 42, 43 toward the left (and of course the feeler-carrier-arm 45), the upturned portion 57 of the rod pressing directly on the strap or clamp 61, thus expanding the spring 64. Thus as the shuttle approaches the end of its throw the feeler-carrier is carried with it, and the yoke is enabled to always register with the filler in the shuttle. Hence as the yoke is always exactly over the filler when the shuttle is sufficiently near that end of the loom to engage the picker-stick, the feeler is always exactly in the same relative position at the time when it is to be swung down into position on the filler. The feeler and feeler-carrier rod are, with the hub 42, 43, returned to their normal position by the contraction of the spring 64.

By means of the spring 117, wire frame 111, arms 101, and fingers 102, the yoke is yieldingly centered, and by means of said spring and the head 116 provided with the arm 120, the pressure of the lower leg of the rod 122 under the shoulder 123 is regulated.

By adjusting relatively the set-screws 121 which set against opposite edges of a flattened portion of the U-shaped rod 122 (indicated at 171 in Fig. 10), the head 115 is swung up or down, thus raising or lowering the feeler by means of the frame 111 to accommodate different thicknesses produced by coarse or fine filling.

It will be understood that when the shuttle is at the right end of the loom the crank 86 does not strike the lever 124, and the feeler dips into the shuttle-box.

The construction of the detecting feeler 89, as illustrated, is an important factor in determining the accuracy of the mechanism. It is important that the replenishing action should be initiated when there is a minimum of yarn on the bobbin (or other weft-carrier) to reduce waste, and that this should be uniformly true in spite of such variations in the position of the bobbin in the shuttle as may occur in practice. This is secured by the character of the feeler 89. This feeler is a yoke; and, as well shown in Figs. 10 and 11, it is forked shaped comprising two fixed diverging legs with their inner faces at an angle to each other. This forked yoke descends upon the bobbin in such manner that these irregular or diverging faces come in contact with the bobbin filling on opposite sides of a plane passing through the bobbin axis; and, as the filling becomes depleted the feeler approaches progressively nearer and nearer to the axis of the bobbin. Eventually this approach is close enough to initiate the replenishing action as indicated in Fig. 11. At this critical time, the feeler is limited against further movement by the bobbin with such yarn as still overlies it, the two diverging inner faces of the yoke legs both contacting with the depleted bobbin. It is obvious that this will occur when the bearing points of these faces are a definite distance apart, and irrespective (within practical limits) of the exact position of the weft-carrier in the shuttle, thus insuring uniformity of action. It will be noted that the detecting feeler is always limited in its detecting movement by the bobbin, both when full or having ample filling to continue the weaving, and when depleted to the extent that replenishment is requisite and the replenishing mechanism is called into action.

Having thus fully described my invention, what I claim, and desire to secure by Letters Patent, is:—

1. In a loom, the lay, a shuttle filling-supplying mechanism, a feeler-carrier-rod supported by the lay, connecting mechanism intermediate of the feeler-carrier-rod and the filling-supplying mechanism, a feeler-frame or carrier, a feeler slidingly supported in said frame or carrier, a feeler-carrier-arm adapted to support the feeler in a raised position, and mechanism intermediate of the feeler-carrier-arm and the stationary portion of the loom whereby said arm is swung down with the forward throw or beat of the lay, thus allowing the feeler to enter the shuttle-box into engagement with the filling.

2. In a loom, the lay, a shuttle filling-supplying mechanism, a feeler-carrier-rod rotatively supported by the lay, connecting mechanism intermediate of the feeler-carrier-rod and the filling-supplying mechanism, a feeler-frame or carrier, a feeler slidingly supported in said frame or carrier, a feeler-carrier-arm adapted to support the feeler in a raised position, spring-mechanism for holding the feeler carrier arm normally in a raised position, an arm swinging on the feeler-carrier-rod and held normally in a raised position, and mechanism connecting said arm with a stationary portion of the lay, whereby it is swung down with each forward throw or beat of the lay and allowed to swing up with the rearward movement thereof.

3. In a loom, the lay, a shuttle filling-supplying mechanism, a feeler-frame or carrier, a feeler yieldingly supported in said frame or carrier, a feeler-carrier-rod rotatively supported by the lay and bent into shape to support the feeler-frame or carrier above the shuttle-box, connecting mechanism intermediate of the feeler-carrier-rod and the filling-supplying mechanism, a feeler-carrier-arm pivotally connected with the feeler-carrier-rod, yielding mechanism for holding the feeler-carrier arm in a normally raised position, a finger extending from said feeler-carrier-arm under and normally supporting the portion of the feeler-carrier-rod which sustains the feeler, and mechanism intermediate of the feeler-carrier-arm and stationary portion of the loom, whereby said arm is swung down with the forward throw or beat of the lay, allowing the feeler to move toward the shuttle-box.

4. In a loom, the lay, a shuttle filling-supplying mechanism, a feeler-frame or carrier, a feeler yieldingly supported in said frame or carrier, a feeler-carrier-rod rotatively supported by the lay and bent into shape to support the feeler-frame or carrier above the shuttle-box, connecting mechanism intermediate of the feeler-carrier-rod and the filling-supplying mechanism, a feeler-carrier-arm pivotally connected with the feeler-carrier-rod, yielding mechanism for holding the feeler-carrier-arm in a normally raised position, a finger extending from said feeler-carrier-arm and provided at its free end with a grooved plate extending under and normally supporting the portion of the feeler-carrier-rod which sustains the feeler, and mechanism intermediate of the feeler-carrier-arm and the stationary portion of the loom whereby said arm is swung down with the forward throw or beat of the lay, allowing the feeler to move toward the shuttle-box.

5. In a loom, the lay, a shuttle filling-supplying mechanism, a feeler-frame or carrier, a feeler yieldingly supported in said frame or carrier, a feeler-carrier-rod rotatively supported by the lay and bent into shape to support the feeler-frame or carrier above the shuttle-box, connecting mechanism intermediate of the feeler-carrier-rod and the filling-supplying mechanism, a feeler-carrier-arm pivotally connected with the feeler-carrier-rod, yielding mechanism for holding the feeler-carrier-arm in a normally raised position, an arm or bracket extending from the lay into the path of the feeler-carrier-arm whereby its movement forward or away from the shuttle is limited, a finger extending from said feeler-carrier-arm under and normally supporting the portion of the feeler-carrier-rod which sustains the feeler, and mechanism intermediate of the feeler-carrier-arm and stationary portion of the loom whereby said arm is swung down with the forward throw or beat of the lay, allowing the feeler to move toward the shuttle-box.

6. In a loom, the lay, a shuttle filling-supplying mechanism, a feeler-frame or carrier, a feeler yieldingly supported in said frame or carrier, a feeler-carrier-rod comprising a substantially horizontal portion and a portion bent into shape to support the feeler-frame or carrier above the shuttle-box, connecting mechanism intermediate of the feeler-carrier-rod and the filling-supplying mechanism, an arm or bracket rigidly connected with the lay and supporting rotatively the horizontal portion of the feeler-carrier-rod, a feeler-carrier-arm pivotally connected with the feeler-carrier-rod and held normally in a raised position and extending under and supporting that portion of the feeler-carrier-rod which sustains the feeler, a spring connecting the said arm or bracket and feeler-carrier-arm, a head or disk rigidly connected with the feeler-carrier-rod at the point where it is bent from a horizontal into an upturned position, and a spring connecting the hub of the feeler-carrier-arm with said head or disk, whereby the feeler-carrier-arm is held normally in a raised position and the portion of the rod sustaining the feeler is held normally down into engagement with the feeler-carrier-arm.

7. In a loom, the lay, a shuttle filling-supplying mechanism, a feeler-frame or carrier, a feeler yieldingly supported in said frame or carrier, a feeler-carrier-rod comprising a substantially horizontal portion and a portion bent into shape to support the feeler-frame or carrier above the shuttle-box, connecting mechanism intermediate of the feeler-carrier-rod and the filling-supplying mechanism, an arm or bracket rigidly connected with the lay and supporting rotatively the horizontal portion of the feeler-carrier-rod and provided with a tubular stud extending from its hub, a feeler-carrier-arm pivotally connected with the feeler-carrier-rod and held normally in a raised position and extending under the portion of the feeler-carrier-rod which sustains the feeler, the hub of the feeler-carrier-arm being provided with a tubular extension or stud surrounding a portion of the stud which extends from said bracket, a spring surrounding said two studs and connected at its opposite ends with said bracket and feeler-carrier-arm, a head or disk rigidly connected with the feeler-carrier-rod at the point where it is bent from a horizontal into an upturned position, a tubular hub extending from the hub of the feeler-carrier-arm toward said head or disk, and a spring surrounding the hub which extends toward the disk and connected at its opposite ends with the hub of the feeler-carrier-arm and the head or disk, the horizontal portion of the feeler-carrier-rod extending through the said studs and hub and bending in said head or disk.

8. In a loom, a shuttle filling-supplying mechanism, a feeler supported slidingly by the lay over the shuttle-box, mechanism for moving said feeler downward into the box, a picker-stick, a picker-check mechanism, and mechanism intermediate of the picker-check mechanism and the mechanism for supporting the feeler, whereby as the shuttle engages the picker-stick and the picker-stick engages the check-mechanism the feeler is moved simultaneously with the moving shuttle and is retained in the same position with relation to the shuttle from the time of the engagement of the shuttle with the checking mechanism to the end of its throw, thus allowing the feeler to come in contact with the filler at whatever point the shuttle stops.

9. In a loom provided with filling-supplying mechanism, a feeler and feeler-frame, a feeler-carrier or support slidingly connected with said frame, connecting mechanism intermediate of the feeler-carrier and the filling-supplying mechanism, means extending from the feeler-frame for holding the feeler and carrier in engagement when the carrier is at its highest point with relation to the feeler-frame, means for holding the feeler and its frame and carrier in a normally raised position over the shuttle-box, means for lowering the feeler with its frame and carrier, and means when the filling is nearly exhausted for lowering the feeler into contact therewith and at a certain predetermined point releasing the feeler-frame and carrier from rigid engagement and allowing the carrier to slide downward.

10. In a loom provided with filling-supplying mechanism, a feeler and feeler-frame, a feeler-carrier or support slidingly connected with said frame, connecting mechanism intermediate of the feeler-carrier and the filling-supplying mechanism, means extending from the feeler-frame for holding the feeler and carrier in engagement when the carrier is at its highest point with relation to the feeler-frame, the lay, a swinging arm mounted on the lay and supporting the feeler in a normally raised position over the shuttle-box, means for lowering the swinging arm with the forward movement of the lay and thus swinging the feeler down toward the shuttle-box, and means when the filling is nearly exhausted for lowering the feeler into contact therewith and beyond the limit of the movement of the swinging arm and releasing the feeler-frame and carrier from rigid engagement.

11. In a loom provided with filling-supplying mechanism, a feeler, a curved feeler-frame, a feeler-carrier or support slidingly connected with the feeler-frame whereby the feeler-frame moves in a relatively curved path and in a vertical plane, means for holding the feeler-frame and feeler-carrier in engagement when the carrier is at its highest point with relation to the feeler-frame, connecting mechanism intermediate of the feeler-carrier and the filling-supplying mechanism, means for holding the feeler and its frame and carrier in a normally raised position over the shuttle-box, means for lowering the feeler and its frame and carrier, and mechanism for releasing the feeler-frame and carrier when the descent of the feeler into the shuttle reaches a predetermined point.

12. In a loom provided with filling-supplying mechanism, a feeler, a curved feeler-frame, a pivotally sustained feeler-carrier or support slidingly connected with the feeler-frame whereby the feeler-frame moves in a relatively curved path and in a vertical plane, connecting mechanism intermediate of the feeler-carrier and the filling-supplying mechanism, means for limiting the rotation or swinging movement of the feeler-carrier, means for holding the feeler-frame and feeler-carrier in engagement when the carrier is at its highest point with relation to the feeler-frame, means for holding the feeler and its frame and carrier in a normally raised position over the shuttle-box, means for lowering the feeler and its frame and carrier, and mechanism for releasing the feeler-frame and carrier when the descent of the feeler into the shuttle reaches a predetermined point.

13. In a loom provided with filling-supplying mechanism, a feeler, a curved feeler-frame, a pivotally sustained feeler-carrier or support slidingly connected with the feeler-frame whereby the feeler-frame moves in a relatively curved path and in a vertical plane, connecting mechanism intermediate of the feeler-carrier and the filling-supplying mechanism, spring-controlled mechanism for holding the feeler-frame and feeler-carrier in engagement when the carrier is at its highest point with relation to the feeler-frame, mechanism for adjusting the tension of said spring-controlled mechanism, means for holding the feeler and its frame and carrier in a normally raised position over the shuttle-box, means for lowering the feeler and its frame and carrier, and mechanism for releasing the feeler-frame and carrier when the descent of the feeler into the shuttle reaches a predetermined point.

14. In a loom provided with filling-supplying mechanism, a yoke-shaped feeler, a curved feeler-frame, a pivotally sustained feeler-carrier or support slidingly connected with the feeler-frame whereby the feeler-frame moves in a relatively curved path and in a vertical plane, connecting mechanism intermediate of the feeler-frame and the filling-supplying mechanism, means for limiting the rotative or swinging movement of the feeler-carrier, spring-controlled mechanism for holding the feeler-frame and feeler-carrier in engagement when the said carrier is at its highest point with relation to the feeler-frame, mechanism for adjusting the tension of said spring-controlled mechanism, a wire frame or hanger extending from said adjustable spring-controlled mechanism under the crotch or highest point of the yoke-shaped feeler, means for holding the feeler and its frame and carrier in a normally raised position over the shuttle-box, means for lowering the feeler and its frame and carrier, and mechanism for releasing the feeler-frame and carrier when the descent of the feeler into the shuttle reaches a predetermined point.

15. In a loom provided with a filling-supplying mechanism, a feeler slidingly supported on the lay over the shuttle-box, mechanism for moving said feeler downward into the box, a picker-check mechanism, mechanism intermediate of the picker-check mechanism and the mechanism for supporting the feeler whereby the feeler and shuttle are moved simultaneously in the same direction during the operation of the check-mechanism, a latch-mechanism for actuating the filling-supplying mechanism, and mechanism extending from the feeler-supporting mechanism and adapted to be moved into engagement with said latch by the forward throw or beat of the lay except when the filling in the shuttle is nearly exhausted, whereby a fresh supply of filling is produced at a predetermined time.

16. In a loom, the lay, a feeler-mechanism, a filling-supplying mechanism, a rotative feeler-carrier-rod supporting the feeler-mechanism and sustained by the lay, an arm or crank extending from said feeler-carrier-rod, mechanism secured to the frame of the loom and operating to rotate the rod and swing the arm or crank in the opposite direction of the movements of the lay, a sliding latch-mechanism mounted on the breast-beam with its latch in the path of the swinging arm or crank whereby the latch-jaw is lifted when the volume of filling in the shuttle is sufficient to allow the throw of the swinging arm or crank to reach the latch, and mechanism intermediate of the filling-supplying mechanism and the sliding latch whereby when the filling is low the slide is operated and a new supply provided.

17. In a loom, a lay, a feeler, a feeler-supporting mechanism sustained by the lay and provided with an engaging arm controlled by the feeler, the breast-beam, the latch-mechanism comprising a sliding bar mounted on the breast-beam and provided with a pivoted latch-jaw at its front end, and a latch-lever rigid on a lifting rod mounted on the slide and in engagement with the jaw, said latch-lever being in the path of said engaging arm.

18. A detecting feeler of a weft-replenishing loom having diverging legs with their inner faces at an angle to each other, said diverging inner faces contacting with the weft-carrier and its overlying filling to limit the detecting movement of the feeler both when the weft-carrier has ample filling and when the filling is depleted to an extent that replenishment is requisite and the replenishing mechanism is brought into action.

19. A detecting feeler of a weft-replenishing loom having diverging inner faces contacting with the weft-carrier and its overlying filling to limit the detecting movement of the feeler both when the weft-carrier has ample filling and when the filling is depleted to an extent that replenishment is requisite and the replenishing mechanism is brought into action.

In testimony whereof I have signed my name this 9th day of October, 1908.

NAZAIRE DEMERS

Witnesses:
A. W. Edwards,
Edward Dana Osgood.